US010396853B1

(12) United States Patent
Olsson et al.

(10) Patent No.: US 10,396,853 B1
(45) Date of Patent: Aug. 27, 2019

(54) SURFACE WAVE CONVERTER

(71) Applicant: Telefonaktiebolaget LM Ericsson (publ), Stockholm (SE)

(72) Inventors: Bengt-Erik Olsson, Mountain Lakes, NJ (US); Jonas Fridén, Mölndal (SE); Per Ligander, Göteborg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/994,338

(22) Filed: May 31, 2018

(51) Int. Cl.
*H04B 3/52* (2006.01)
*H04B 3/54* (2006.01)

(52) U.S. Cl.
CPC ....... *H04B 3/54* (2013.01); *H04B 2203/5425* (2013.01); *H04B 2203/5441* (2013.01)

(58) Field of Classification Search
CPC .................................... H04B 3/52; H01P 3/10
See application file for complete search history.

(56) References Cited

U.S. PATENT DOCUMENTS 2,685,068 A 7/1954 Goubau
7,009,471 B2 3/2006 Elmore
9,998,172 B1 * 6/2018 Barzegar .............. H04B 1/7163
2005/0111533 A1 5/2005 Berkman et al.

OTHER PUBLICATIONS

Goubau, et al."Investigations of a Surface Wave Line for Long Distance Transmission," IRE Transactions, pp. 263-267, Aug. 1952.
AT & T. "AT&T Launches Project AirGig Trials to Bring Ultra-Fast Internet Over Power Lines Closer to Reality"; Retrieved from the Internet: URL: http://about.att.com/story/project_airgig_trials_georgia.html [retrieved on Jun. 1, 2018]; Dec. 31, 2017; pp. 1-5; Dallas, TX.
Eline Corridor Systems; Corporate website; Retrieved from the Internet: URL: www.corridor.biz [retrieved on Jun. 1, 2018]; 2018; pp. 1-11.

* cited by examiner

*Primary Examiner* — Kevin Kim
(74) *Attorney, Agent, or Firm* — Coats & Bennett, PLLC

(57) ABSTRACT

A surface wave converter for transmitting electromagnetic signals via a surface wave conduit. The surface wave converter comprises an input port, an interface, and a plurality of waveguide adapters. The input port is configured to receive an input signal. The plurality of wave guide adapters are for mounting along a circumference of the surface wave conduit and are configured to jointly excite a surface wave on the surface wave conduit based on the input signal. The interface configured to distribute the input signal received on the input port over the waveguide adapters via respective waveguide adapter ports.

37 Claims, 6 Drawing Sheets

SURFACE WAVE CONVERTER

TECHNICAL FIELD

The present disclosure relates to communication systems using surface wave propagation, and to transmission arrangements for transmitting and receiving surface waves over a surface wave conduit such as an overhead power line wire.

BACKGROUND

In next generation mobile access systems, there is a need for densification of the radio base stations (RBS) that connect mobile users and devices to the mobile core network. A major issue with densification in a city environment is to find sites for mounting radio base stations. The conventional approach of mounting RBSs on roof tops and towers will not always be viable, since it is difficult to, e.g., negotiate contracts with so many property owners.

An attractive solution is to approach owners of existing city environment infrastructure, such as utility poles, light poles, street furniture etc. where there is a single owner that can provide installation space in many locations with a single contract. However, it may be difficult to provide backhaul to RBSs that sit in locations where there are no fiber connections available.

Microwave point-to-point links can be used to backhaul radio base stations. However, frequency licenses can be difficult and costly to obtain.

Surface waves and surface wave transceiver systems have been investigated for a long time, but never brought to commercial success due to lack of viable applications as well as technical difficulties. Surface waves transmission involves transmitting a signal by exciting the surface wave on the outside of a conduit. Surface wave reception involves receiving a signal by receiving a surface wave propagating on the outside of a conduit.

U.S. Pat. No. 2,685,068 discloses a surface wave transmission line.

U.S. Pat. No. 7,009,471 discloses a launch apparatus for launching a surface wave onto a single conductor transmission line.

SUMMARY

The present disclosure provides improved surface wave transmission systems and converters, as well as methods for improved surface wave transmission and reception.

A surface wave converter is provided for transmitting electromagnetic surface wave signals via a surface wave conduit. The surface wave converter comprises an input port, an interface, and a plurality of waveguide adapters. The input port is configured to receive an input signal. The plurality of wave guide adapters are for mounting along a circumference of the surface wave conduit. The waveguide adapters are configured to jointly excite a surface wave on the surface wave conduit based on the input signal. The interface is configured to distribute the input signal received on the input port of the surface wave converter over the plurality of waveguide adapters via respective waveguide adapter ports.

One purpose of the disclosed surface wave converter, or surface wave launcher, is to make the surface wave evolve in as short a distance as possible on the conduit by creating an electromagnetic field in the surface wave converter output that is as similar as possible to the desired surface wave. Rapid evolution of the surface wave is important in order to reduce coupling loss to the surface wave as well as minimizing coupling to air. This is here achieved by having multiple waveguide adapters mounted around a circumference of the conduit. These waveguide adapters are then connected to an interface which distributes the signal power between the waveguide adapters mounted on the conduit. The plurality of waveguide adapters and the distributing interface thereby provide improved transition between electrical signal and surface wave, and also a smoother field around the conduit.

In other words, the disclosed surface wave converter aims to reduce the loss in the conversion from cable to surface wave. This is achieved by making the surface wave evolve as quickly as possible on the wire, i.e., in a short distance from waveguide adapter to fully evolved surface wave. Reducing the loss also means that radiation into air is reduced and also that pickup of inbound radio waves, i.e. interference, is reduced.

An advantage of the proposed surface wave converter is that it produces a better electromagnetic field for exciting the surface wave around the conduit compared to known surface wave launchers, and thus minimizes the loss and potential coupling to air waves compared to previous solutions.

Also, since it uses discrete waveguide adapters it can be made foldable for easy mounting on top of an existing wire.

Furthermore, the plurality of waveguide adapters can be quite small, thus minimizing protrusions from the conduit.

In one or more embodiments herein, the waveguide adapters are arranged evenly spaced along the circumference of the surface wave conduit. For instance, in an embodiment, the waveguide adapters constitute three waveguide adapters arranged 120 degrees apart along the circumference of the surface wave conduit. The evenly spaced waveguide adapters allow better matching between generated electromagnetic field and propagating surface wave. It is, however, appreciated that the disclosure is not limited to evenly spaced waveguide adapters, but can also be applied to unevenly arranged waveguide adapters.

In one or more embodiments herein, the surface wave conduit is a power line wire. In some parts of the world, e.g. North and South America, it is common to have utility poles along the streets for holding power line wires, transformers and other equipment related to power supply for nearby homes and businesses. These power line wires could serve as conduits for backhauling transmission and reception of surface waves.

In one or more embodiments herein, the waveguide adapters are configured to electromagnetically match a transition between an electrical signal at the interface and a surface wave on the surface wave conduit. Thus, by arranging adapters to match the transition between electrical signal and surface wave, improved electromagnetic properties of the surface wave is obtained. For instance, a return loss and an insertion loss performance of the system is improved by the matching. A system gain is also improved by the disclosed surface wave converter.

In one or more embodiments herein, one or more waveguide adapters comprise open-ended coaxial cables. By implementing the adapters using open-ended coaxial cables, simple and cost-efficient waveguide adapters are obtained. The open-ended coaxial cables are, for example, cut off coaxial cables, or an unterminated end of a waveguide.

In one or more embodiments herein, the waveguide adapters are configured in a fixture. The fixture is configured to maintain relative positions of the waveguide adapters on the circumference of the surface wave conduit. Advantageously, the fixture simplifies installation in that the plurality of waveguide adapters need not be individually mounted on the conduit since they are held together and in place by the fixture.

Also, as will be discussed in more detail below, the fixture optionally is used to galvanically isolate the waveguide adapters and the interface from the conduit. The conduit is a power line wire associated with high voltage. Also, optionally, the fixture is used to improve a matching between the waveguide adapters and the conduit. This way a transition from electrical signal to surface wave is improved which results in better performance with respect to, e.g., insertion loss and return loss characteristics.

Optionally, as discussed in more detail below, the fixture comprises a dielectric element in which the plurality of waveguide adapters are embedded. For instance, the dielectric element can have a shape for matching an electromagnetic transition between the plurality of waveguide adapters and the surface wave conduit.

In one or more embodiments herein, the fixture is separable into two or more pieces, wherein the two or more pieces are configured to enclose and to hold the surface wave conduit when mounted on the surface wave conduit. This simplifies installation of the converter, particularly if the separable pieces of the fixture are configured with an optional hinge and locking mechanism. Hereby, the plurality of waveguide adapters is mounted around, e.g., a wire, to facilitate quicker evolution of a surface wave onto the wire, enabling lower loss and low coupling to air. The concept also, by the fixture, allows for quick and secure mounting onto, e.g., a high voltage wire. In one or more embodiments herein, a quickly evolving surface wave is a surface wave which forms in a short distance measured from the origin, i.e., from a waveguide adapter.

In one or more embodiments herein, the interface comprises an active or a passive power splitter device configured to distribute the input signal received on the input port over the plurality of waveguide adapters.

In one or more embodiments herein, the interface comprises one or more phase shifters, each phase shifter being configured to shift a phase of a signal output from a respective waveguide adapter in dependence of a phase shift configuration. The optional phase shifters improve performance of the system in that the generation of the surface wave is calibrated or controlled to maximize performance.

In one or more embodiments herein, the input signal is an electrical or optical signal, and the surface wave converter is configured to convert the electrical or optical signal to an electromagnetic surface wave.

There are also disclosed herein methods, computer programs, computer program products for surface wave converters, and communication systems comprising surface wave conduits and one or more surface wave converters associated with the above-mentioned advantages.

BRIEF DESCRIPTION OF THE DRAWINGS

The present disclosure will now be described in more detail with reference to the appended drawings, where FIG. 1 schematically illustrates a communication system based on surface wave transmission.

DETAILED DESCRIPTION

Figure 1:
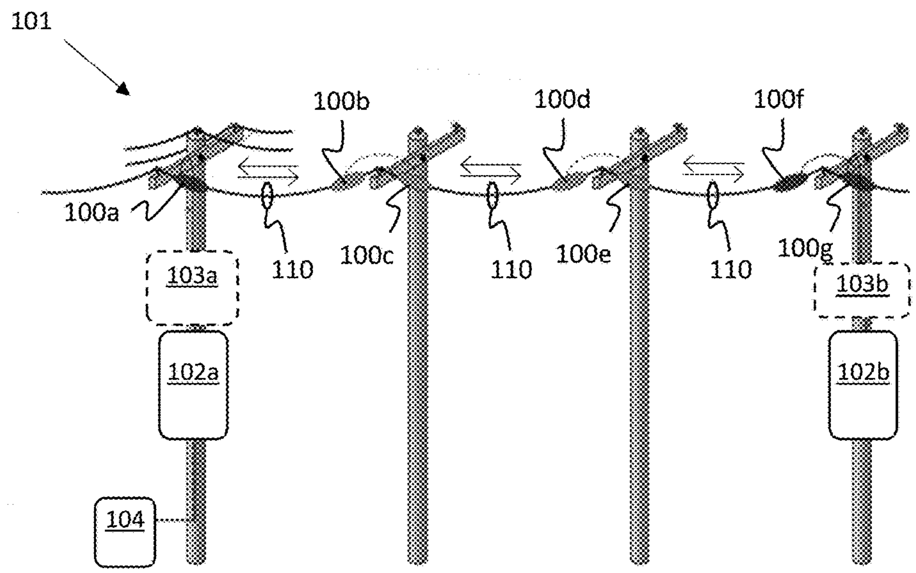

Aspects of the present disclosure will now be described more fully with reference to the accompanying drawings. The different devices, computer programs and methods disclosed herein can, however, be realized in many different forms and should not be construed as being limited to the aspects set forth herein. Like numbers in the drawings refer to like elements throughout.

The terminology used herein is for describing aspects of the disclosure only and is not intended to limit the invention. As used herein, the singular forms "a", "an" and "the" are intended to include the plural forms as well, unless the context clearly indicates otherwise.

A surface wave converter converts an electrical field in, e.g., a coaxial cable or a microwave waveguide, into a surface wave that propagates and sustains along a conduit, such as a wire. Unlike an electromagnetic field inside a wire or waveguide, the surface wave exists and propagates on the outside of a conduit such as a wire or surface. The surface wave converter can be implemented in a low complexity fashion using, e.g., an open-ended or cut coaxial cable ending on top of the wire.

A challenge with surface wave transmission and reception is to keep the loss, i.e., insertion loss and return loss, low between the input electromagnetic field and the evolved surface wave. The loss is also partly associated with radiation into air waves where part of the signal energy is radiated as from a conventional radio antenna. This is highly undesirable since energy leaked into air can interfere with other radio equipment in the area and when the surface wave converter is used to convert an incoming surface wave into conventional electromagnetic signal, it may pick up other radio signals that can cause interference with the surface wave signal. Thus, an important aspect to consider when designing a surface wave system is the minimization of coupling between surface wave and airwave radiating radio signals into air.

A conduit of the surface wave is a medium along which the surface wave propagates. This conduit is often a wire. In other cases, the conduit is a surface or some other conduit. Herein, the terms conduit and wire will be used interchangeably, which interchangeable use is not intended to limit the disclosure.

FIG. 1 schematically illustrates a communication system 101 based on surface wave transmission. The communication system 101 comprises a surface wave conduit 110 and one or more surface wave converters 100*a*, 100*a*, 100*b*, 100*c*, 100*d*, 100*e*, 100*f*, 100*g* according to the present disclosure. The example communication system shown in FIG. 1 uses overhead power lines for transmission and reception of the surface waves, i.e., in one or more embodiments herein, the surface wave conduit 110 is a power line wire.

There is a communications interface 104 which, e.g., is a location where a fiber connection interfaces with a core network. The fiber connection is connected to a first wireless access point 102*a*. This first wireless access point 102*a* therefore has direct access to fiber backhaul and is not in need of any further backhauling.

However, a second wireless access point 102*b* is not in direct connection to a fiber connection which can be used for backhauling. To provide backhaul to the second wireless access point 102*b*, surface wave propagation is used. The first wireless access point 102*a* is connected to a surface wave converter 100*a*, via an optional data link device 103*a*.

The data link device 103*a* comprises a modem configured to modulate a data signal for transmission over the conduit 110 and to demodulate a data signal received over the conduit 110.

The wireless access point 102*a*, or the data link device 103*a*, transmits signals via the surface wave converter 100*a* on the conduit 110 as surface waves. The surface waves need to be re-generated at each power line pole. There is configured a bridge comprising two surface wave converter units at each power line pole. At each bridge the surface wave is converted back to electrical signal by a surface wave converter unit, and then converted to surface wave on the next conduit in sequence. Eventually the transmission reaches the second wireless access point 102*b*, via an optional second data link device 103*b*. The transmission goes both ways, i.e., also to the communications interface 104 from the second wireless access point 102*b*.

It is appreciated that the electrical signals in one or more embodiments is partly replaced by optical signals on some interfaces, but that an electrical signal is needed in order to excite the surface wave.

A backhaul signal transmission from the second wireless access point 102*b* towards the communication interface 104 starts out as an electrical signal (or an optical signal). The electrical or optical signal passes via a second data link device 103*b* configured as interface between the wireless access point 102*b* and the rest of the surface wave communication system 101. The backhauling signal is converted to a surface wave by means of a surface wave converter 100*f*. The surface wave travels along the conduit 110 until it reaches a pole. The surface wave is here converted by another surface wave converter 100*e* into electrical signal. The electrical signal is transmitted to a surface wave converter 100*d* configured on the next power line wire, which generates again a surface wave based on an electrical signal. This process continues until the transmission reaches surface wave converter 100*a* and the point where the communication interface 104 is configured.

FIG. 1 shows an example surface wave transmission system. One of the main technical problems associated with surface wave transmission is getting the signal on and off the conduit 110, i.e., to excite the surface wave on the wire and to receive surface waves propagating on the wire. The present disclosure provides improved surface wave converters which allow for a more efficient generation and reception of surface waves on a surface wave conduit.

To the extent FIGS. 2-11 are described with reference to transmitting a surface wave, one of ordinary skill in the art will understand this is merely an example, and that the described structures could also be used to receive a surface wave or to both transmit and receive in accordance with described methods herein.

Figure 2:
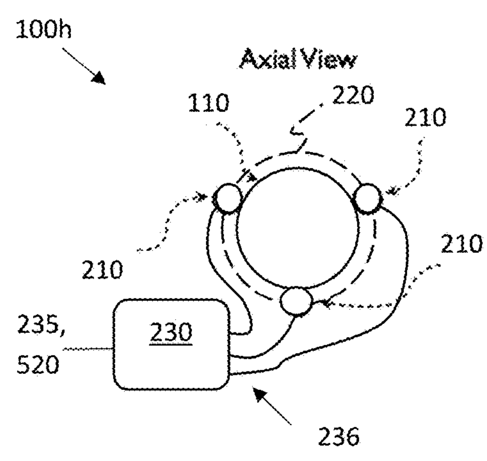
FIGS. 2-3 show axial views of surface wave converters.
Figure 3:
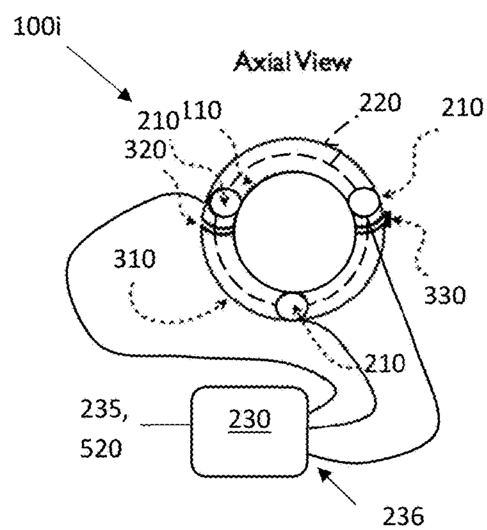

FIGS. 2-3 show axial views of surface wave converters 100*h* and 100*i*. FIG. 2 shows a surface wave converter 100*h* with three waveguide adapters 210 mounted along a circumference 220 of a surface wave conduit 110. These waveguide adapters are configured to jointly excite a surface wave on the surface wave conduit 110 based on an input signal. This way, since the surface wave is jointly excited by a plurality of waveguide adapters instead of by a single waveguide adapter, it becomes possible to generate a better surface wave associated with lower loss compared to known surface wave converters and launchers. Surface waves can, in principle, be excited at any frequency but in the context of telecommunications the operating frequency is usually at frequencies above 1 GHz and can extend up to almost 100 GHz.

FIG. 2 exemplifies the plurality of waveguide adapters by three evenly spaced waveguide adapters 210, however, as will be discussed below, the waveguide adapters need not be evenly spaced, and there can be any number of waveguide adapters, as long as there are two or more waveguide adapters to make a plurality of waveguide adapters.

In one or more embodiments herein, the waveguide adapters 210 are configured to electromagnetically match a transition between an electrical signal at the interface 230 and a surface wave on the surface wave conduit 110. This electromagnetic matching can be achieved in many ways, as the skilled person will realize. For example, the waveguide adapters can be configured with specific shapes for matching the transition between electric signal and surface wave. The waveguide adapters can also be configured in connection with a dielectric element (e.g. a lens arrangement or lenses) configured to improve the matching properties of the waveguide adapters with respect to the surface wave conduit. It is appreciated that the matching is usually frequency dependent. Thus, in one or more embodiments herein, the waveguide adapters 210 are configured to electromagnetically match a transition between an electrical signal at the interface 230 and a surface wave on the surface wave conduit 110 based on a frequency band of operation associated with the surface wave converter 100.

The waveguide adapters can be realized with varying degrees of complexity. For instance, the waveguide adapters 210 are realized by using open-ended coaxial cables. Such waveguide adapters are especially easy to construct and will be very cost-efficient. To improve electromagnetic matching properties, the open-ended coaxial cable, in one or more embodiments herein, is combined with dielectric lens arrangements, or have tapered end sections in order to reduce, e.g., insertion loss and reduce air wave propagation emitted from the waveguide adapters.

As an alternative or complement to the open-ended coaxial cables, waveguides can be used in the same manner. Thus, in one or more embodiments herein, the waveguide adapters use waveguides. The waveguides can be implemented using, e.g., metal pipes carrying microwave signals or dielectric waveguides made of plastic or Polytetrafluoroethylene (PTFE).

An interface 230 is configured to connect an input port 235 of the surface wave converter to the plurality of waveguide adapters 210, thereby distributing an input signal received on the input port 235 over the waveguide adapters. The interface 230 receives an input signal on the input port 235 and distributes the input signal over the waveguide adapters. The interface can be of varying complexity ranging from a passive splitter to an active device comprising signal processing functionality. As is commonly understood signal processing functionality can be implemented by circuits implementing a processor or processing circuit hardware, or software, or a combination thereof. The interface and related aspects will be discussed in more detail below.

Consequently, there is disclosed herein a surface wave converter 100*h* for transmitting electromagnetic surface wave signals via a surface wave conduit 110. The surface wave converter 100*h* comprises an interface 230 and a plurality of waveguide adapters 210 for mounting along a circumference 220 of the surface wave conduit 110. The interface 230 is configured to connect an input port 235 of the surface wave converter 100*h* to the plurality of waveguide adapters 210, thereby distributing an input signal received on the input port 235 over the waveguide adapters. The waveguide adapters are configured to jointly excite a surface wave on the surface wave conduit 110 based on the input signal.

Herein, a surface wave converter in one or more embodiments is referred to as a surface wave launcher. The surface wave conduit is any medium on which a surface wave can propagate, i.e., a wire, a rectangular bar, or a surface. A waveguide adapter is any device configured to excite a surface wave based on an input signal. The input signal in one or more embodiments is electric. Alternatively, the input signal is an optical signal, in which case the waveguide adapter is configured to excite a surface wave based on an input optical signal. To distribute means that the input signal is forwarded to each waveguide converter.

In one or more embodiments, the input signal is evenly distributed among waveguide adapters in terms of power or energy. Alternatively, it is unevenly distributed. To jointly excite a surface wave means that the waveguide adapters together excite the surface wave based on their respective distributed input signals obtained through the distribution of the input signal.

FIG. 3 shows an axial view of a proposed surface wave converter 100*i* that has similar features explained with respect to surface wave converter 100*h*, but the waveguide adapters 210 are mounted inside a dielectric material that helps impedance matching as well as fixes the conductive parts of the waveguide adapters, thus avoiding galvanic connection to the wire. The latter is important when mounting the surface wave converter onto a high voltage wire. The dielectric material illustrated in FIG. 3 is an example of a fixture 310. Thus, in one or more embodiments herein, the fixture 310 comprises a dielectric element in which the waveguide adapters 210 are embedded.

In other words, in one or more embodiments herein, the waveguide adapters 210 are configured in a fixture 310. The fixture is configured to maintain relative positions of the waveguide adapters 210 on the circumference 220 of the surface wave conduit 110. This fixture simplifies mounting of the surface wave converter.

In one or more embodiments herein, the fixture 310 is configured to galvanically isolate the waveguide adapters from the surface wave conduit. This galvanic isolation is convenient when the surface wave converter is used together with a high voltage power line.

As discussed above, dielectric elements can be used to improve a matching between the waveguide adapters 210 and the conduit 110. According to some aspects, the dielectric element is configured with a shape for matching an electromagnetic transition between the waveguide adapters 210 and the surface wave conduit 110. According to some such aspects, the dielectric element acts as a lens when jointly exciting the surface wave by the adapters on the conduit.

The example fixture 310 illustrated is FIG. 3 is separable 320 into two or more pieces (only two pieces are shown in FIG. 3). The two or more pieces are configured to enclose and to hold the surface wave conduit 110 when mounted on the surface wave conduit. This way, the surface wave converter can be mounted simply by enclosing the conduit with the fixture. To further simplify the installation process, in one or more embodiments the fixture comprises an optional joint 330 and a locking mechanism. To mount the surface wave converter on, e.g., a power line, is then simply a matter of separating the fixture pieces, enclosing the conduit by the fixture, and locking the waveguide converter in place using the locking mechanisms. The locking mechanism is, for example, a snap-lock mechanism or similar. Alternatively, the locking mechanism is an excenter lock mechanism or similar.

In one or more embodiments herein, the locking mechanism comprises a lock configured to prevent unauthorized persons from tampering with the surface wave converter. This way, authorized personnel are required to use a key, or a code to release the locking mechanisms when servicing or replacing a surface wave converter.

The examples in FIGS. 2 and 3 illustrate waveguide adapters 210 arranged evenly spaced along the circumference 220 of the surface wave conduit 110. However, this is optional since the waveguide adapters can also be spaced unevenly along the circumference of the surface wave conduit.

Also, the example surface wave converters shown in FIGS. 2 and 3 both comprise three waveguide adapters arranged 120 degrees apart along the circumference 220 of the surface wave conduit 110. It is appreciated that this particular arrangement of three evenly spaced waveguide adapters provides a good trade-off between performance and complexity. However, the disclosure is not limited to three waveguide adapters, nor is the disclosure limited to evenly spaced waveguide adapters, as will be evident from the discussion in connection to FIGS. 8-10 below.

Figure 4:
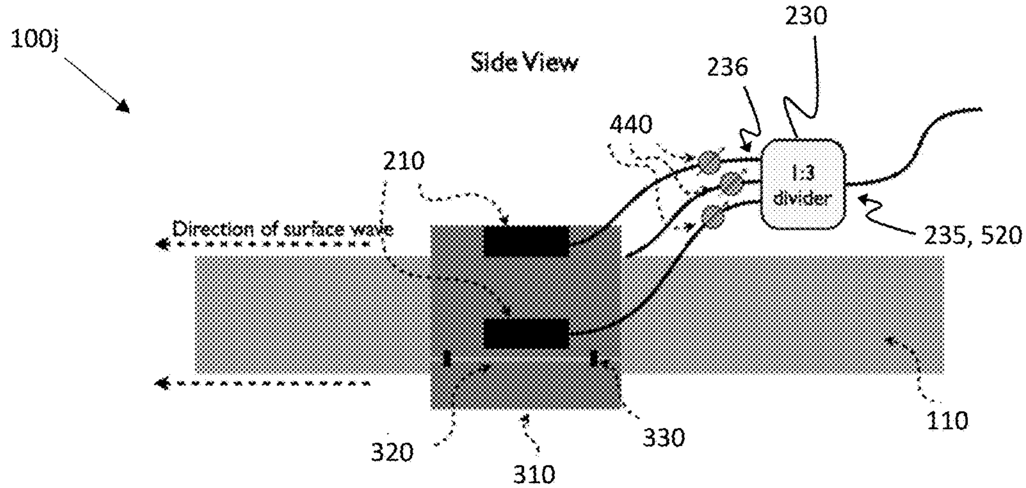
FIG. 4 shows a side view of a surface wave converter.

FIG. 4 shows a side view of a surface wave converter 100*j* transmitting a surface wave on surface wave conduit 110. An input signal is received on the input port 235 of the surface wave converter 100*j*. This input signal is divided, i.e., distributed, over the waveguide adapters 210. Thus, the interface 230 distributes the input signal over waveguide adapter ports 236. Of course one of ordinary skill in the art would appreciate the surface wave converter 100*j* could also be used for receiving a surface wave on surface wave conduit 110 as described herein.

The interface 230 is a passive power splitter configured to distribute the input signal received on the input port 235 over the plurality of waveguide adapters. The interface 230 alternatively could be a more advanced active power splitter configured to distribute the input signal received on the input port 235 over the plurality of waveguide adapters.

To further control the generation of the surface wave on the conduit 110, optional phase shifters 440 are configured between the interface 230 and the waveguide adapters 210. The phase shifts applied to the signals, i.e., the phase shift configuration, is pre-determined or adaptively determined, e.g., to maximize some performance criterion, such as insertion loss.

In case of pre-determined fixed phase-shifts, the phase shift configuration is for instance determined by computer simulation or laboratory experimentation.

In case of adaptive phase shifts, the phase shift configuration in one or more embodiments is updated regularly based on some optimality criterion. Alternatively, or additionally, the phase shifts are determined by cycling through all possible combinations of phase shifts and selecting the combination which gives best performance in terms of some performance criterion. For example, the performance criterion is an insertion loss or return loss, or amount of radiated air wave measured in terms of power or energy.

The waveguide adapters discussed herein and exemplified in FIG. 4 can be simple open-ended or cut coaxial cables or an adapter that impedance match the cable from the power divider to air with wire below for minimum reflections. There can optionally also be manual or electrically controlled phase shifters between the power divider and the waveguide adapters for field phase alignment between the waveguide adapters. The surface wave converter can be made in two or more parts that are mounted together around the wire and secured by e.g. clips or straps. This would allow for quick and secure mounting without touching the wire during installation.

Figure 5:
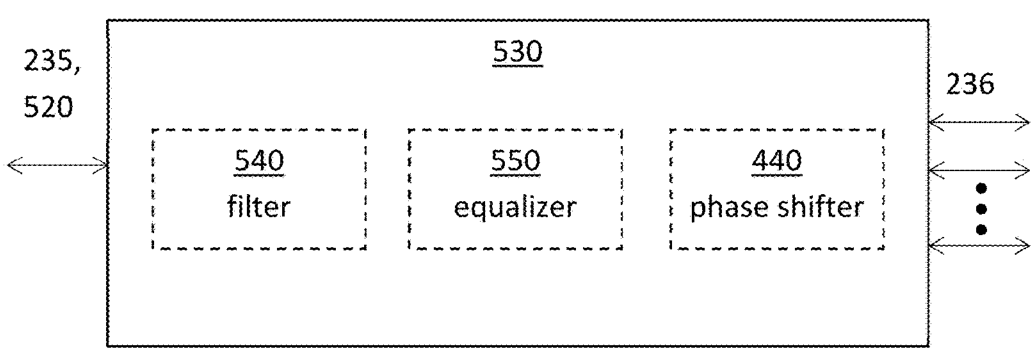
FIGS. 5-6 show surface wave converter interfaces.
Figure 6:
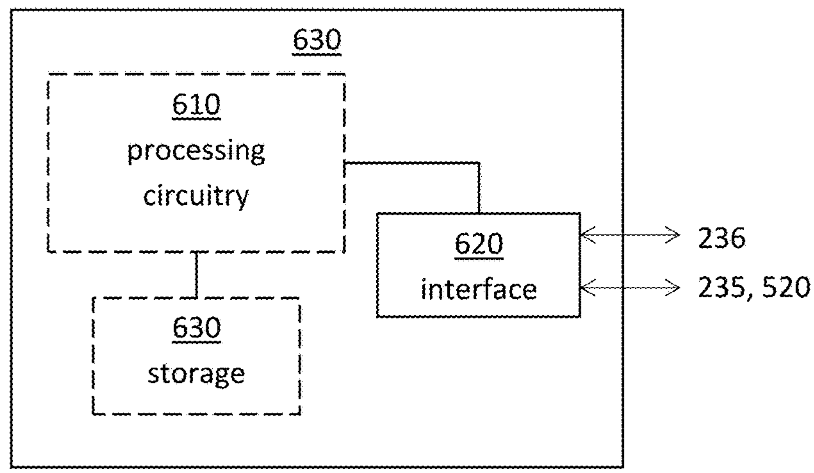

FIGS. 5-6 show surface wave converter interfaces. FIG. 5 schematically illustrates a more advanced interface 530. Signals transferred via the input port 235 is here configured to be subjected to various signal processing functions before distribution over the waveguide adapters on the waveguide adapter ports 236.

According to some example signal processing functions, the signals transferred via the input port 235 is filtered by a filter 540. This filter is an analog filter or alternatively a digital filter, in which case an analog to digital converter is comprised in the interface 530. The filter 540 is configured to filter out interference from a frequency band of interest, or to suppress noise. The filter 540 is an example of a filter structure.

According to some example signal processing functions, the interface 530 also comprises an equalizer 550. This equalizer is configured to compensate for multipath propagation and reflection effects causing signal distortion. The equalizer is updated based on an error signal determined based on the transmitted or received surface wave signals, or it is updated using a blind method such as, e.g., constant modulus equalizer update. The equalizer 550 is an example of a filter structure.

The filter structures 540 and 550 are shown in FIG. 5 in combination. One of ordinary skill in the art would appreciate that in other embodiments, a particular signal processing function is used individually. Consequently, in some example signal processing functions, the interface 530 in one or more embodiments comprises one or more filter structures 540, 550 configured to filter a signal prior to output from a respective waveguide adapter.

FIG. 5 also exemplifies an interface 530 where the phase shifting functionality discussed above with respect to FIG. 4 is integrated in the interface 530. One of ordinary skill in the art would appreciate that in other embodiments the phase shifting functionality and one or more signal processing functions is used individually or in combination.

FIG. 6 schematically illustrates an interface 630 according to any interface described herein. This interface comprises processing circuitry 610 and an interface module 620.

The processing circuitry 610 is provided using any combination of one or more of a suitable central processing unit CPU, multiprocessor, microcontroller, digital signal processor DSP, etc., capable of executing software instructions stored in a computer program product, e.g. in the form of a storage medium 630. The processing circuitry 610 is further provided as at least one application specific integrated circuit ASIC, or field programmable gate array FPGA. For instance, the processing circuitry 610 in one or more embodiments is used to provide the phase shifting functionality or signal processing functions described herein.

Particularly, the processing circuitry 610 is configured to cause the interface 230 or 530 to perform a set of operations, or steps. For example, the storage medium 630 stores the set of operations, and the processing circuitry 610 is configured to retrieve the set of operations from the storage medium 630 to cause the interface to perform the set of operations. The set of operations is provided as a set of executable instructions. Thus, the processing circuitry 610 is thereby configured to execute methods as herein disclosed, such as the methods discussed below in connection to FIG. 12.

In one or more embodiments, the storage medium 630 comprises persistent storage, which, for example, can be any single one or combination of magnetic memory, optical memory, solid state memory or even remotely mounted memory.

The interface 630 further comprises an interface module 620 for communications with at least one external port. As such the interface module 620 comprises one or more transmitters and receivers, comprising analogue or digital components and a suitable number ports for wireline or wireless communication.

The processing circuitry 610 controls the general operation of the interface, e.g., by sending data and control signals to the interface module 620 and the storage medium 630, by receiving data and reports from the interface module 620, and by retrieving data and instructions from the storage medium 630. Other components, as well as the related functionality, of the interface are omitted in order not to obscure the concepts presented herein.

The above discussion has mainly been focused on transmission of surface waves based on input signals to the surface wave converter. However, it is appreciated that all functions and features discussed above can also be used for receiving surface waves via surface wave conduits. Thus, in one or more embodiments herein, the surface wave converter is also configured for receiving electromagnetic signals via the surface wave conduit 110. The interface 230, 530, 630, or 730 is configured to connect the plurality of waveguide adapters to an output port 520 of a surface wave converter. The plurality of waveguide adapters 210 are configured to jointly receive a surface wave on the surface wave conduit 110 and to output the received signal on the output port 520.

Thus, the surface wave converter is, in one or more embodiments herein, configured for bi-directional communication via the surface wave conduit. The waveguide adapter ports 236 are then bi-directional ports configured to transfer signals to and from the waveguide adapters and the interface.

Figure 7:
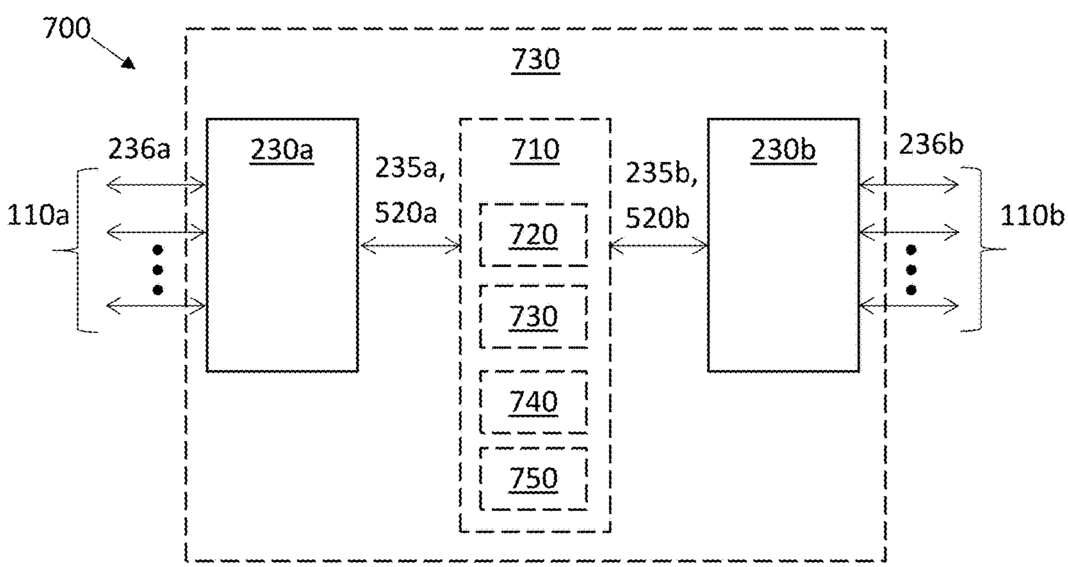
FIG. 7 shows a surface wave converter bridge system.

FIG. 7 shows a surface wave converter bridge system 700. As discussed above in connection to FIG. 1, several surface wave converters (e.g., surface wave converters **100*b* and 100*c*) are needed to bridge sections of the conduit 110 not suitable for surface wave propagation. For instance, as in the example discussed in connection to FIG. 1 above, a power line pole prevents propagation of surface waves past the pole. FIG. 7 illustrates a surface wave converter bridge 700 which can be used to transmit surface wave over separate sections of surface wave conduit. There is one set of waveguide adapter ports 236*a* for exciting a surface wave on a first conduit 110*a* and for receiving surface waves on the first conduit 110*a*. To bridge a connection between the first conduit 110*a* and a second conduit 110*b*, shown to the right in FIG. 7, a first interface 230*a* is configured as discussed above. The first interface 230*a* is connected via an optional bridging element 710 to a second interface 230*b*. It will be appreciated that the first interface 230*a* and second interface 230*b* can be any one of the interfaces described herein. This second interface 230*b* comprises waveguide adapter ports 236*b* for transferring signals to and from the second conduit 110*b***.

The bridging element 710 optionally comprises signal processing functionality to condition the signal prior to re-transmission. In one or more embodiments, the bridging element is a wireless access point as discussed above. For instance, the bridging element 710 comprises one or more of a wireless access point 720, processing circuitry 730, and operations and maintenance functionality 740 for, e.g., fault monitoring.

The processing circuitry 730 is provided using any combination of one or more of a suitable central processing unit CPU, multiprocessor, microcontroller, digital signal processor DSP, etc., capable of executing software instructions stored in a computer program product, e.g. in the form of a storage medium 750. The processing circuitry 730 is further provided as at least one application specific integrated circuit ASIC, or field programmable gate array FPGA. For instance, the processing circuitry 730 in one or more embodiments is used in conjunction with or to provide the signal processing functionality, wireless access point 720 operations and maintenance functionality 740, or both as described herein.

Particularly, the processing circuitry 730 is configured to cause the bridging element 710 or components of the bridging element 710 to perform a set of operations, or steps. For example, the storage medium 750 stores the set of operations, and the processing circuitry 730 is configured to retrieve the set of operations from the storage medium 750 to cause the bridging element 710 or components of the bridging element 710 to perform the set of operations. The set of operations is provided as a set of executable instructions. Thus, the processing circuitry 730 is thereby configured to execute methods as herein disclosed.

In one or more embodiments, the storage medium 750 comprises persistent storage, which, for example, can be any single one or combination of magnetic memory, optical memory, solid state memory or even remotely mounted memory.

Figure 8:
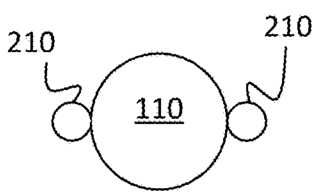
FIGS. 8-10 show axial views of surface wave converters.
Figure 9:
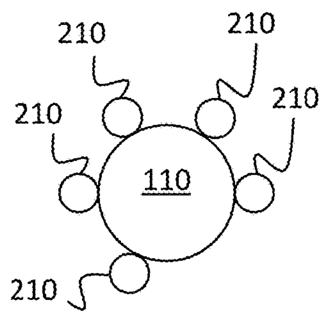
Figure 10:
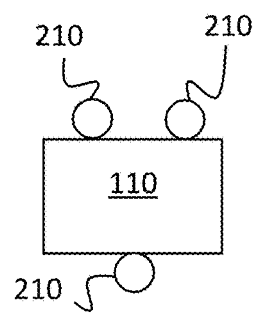

To emphasize that the present disclosure is not limited to any particular arrangements in terms of number of waveguide adapters 210, distribution of waveguide adapters along the circumference of the conduit 110, or conduit geometry, some additional example waveguide adapter configurations are illustrated in FIGS. 8-10.

It is appreciated that the power distribution between waveguide adapters is not necessarily uniform. An unequal power distribution is useful in some cases, depending on, e.g., waveguide geometry.

FIG. 8 illustrates an example where the plurality of waveguide adapters constitutes two waveguide adapters.

FIG. 9 illustrates an example configuration with five unevenly spaced waveguide adapters.

FIG. 10 illustrates an example scenario where the surface wave conduit is a rectangular cross section conduit over which the surface waves propagate.

Figure 11:
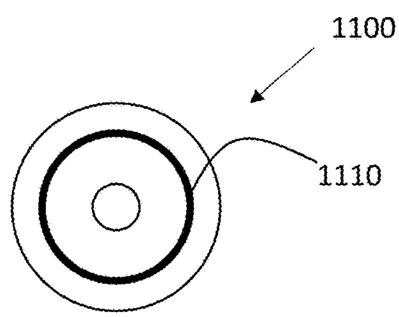
FIG. 11 schematically illustrates a computer program product.

FIG. 11 schematically illustrates a computer program product 1100. The computer program product 1100*a* comprises computer program code which, when executed on processing circuitry 610 in an interface such as the interface 630 discussed above in connection to FIG. 6, causes the processing circuitry to execute functions as discussed herein.

Figure 12A:
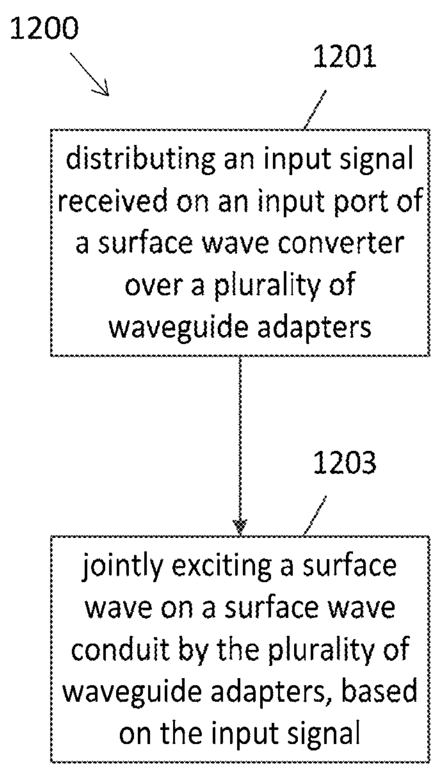
FIGS. 12*a*-12*b*, and FIG. 13 are flow charts illustrating methods described herein.
Figure 12B:
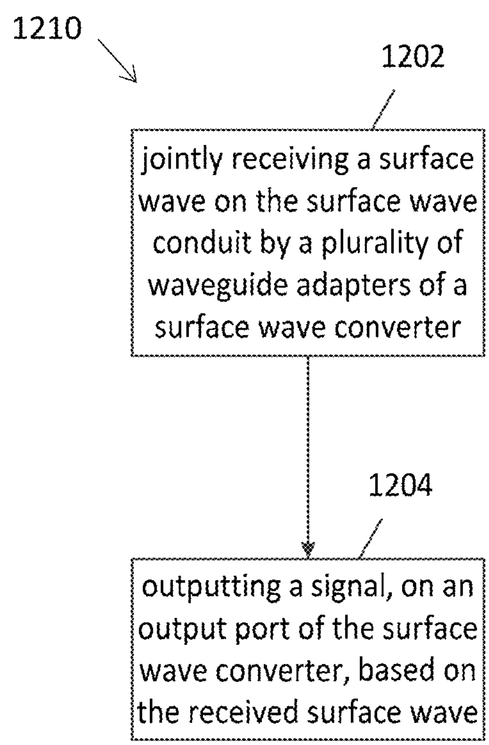
Figure 13:
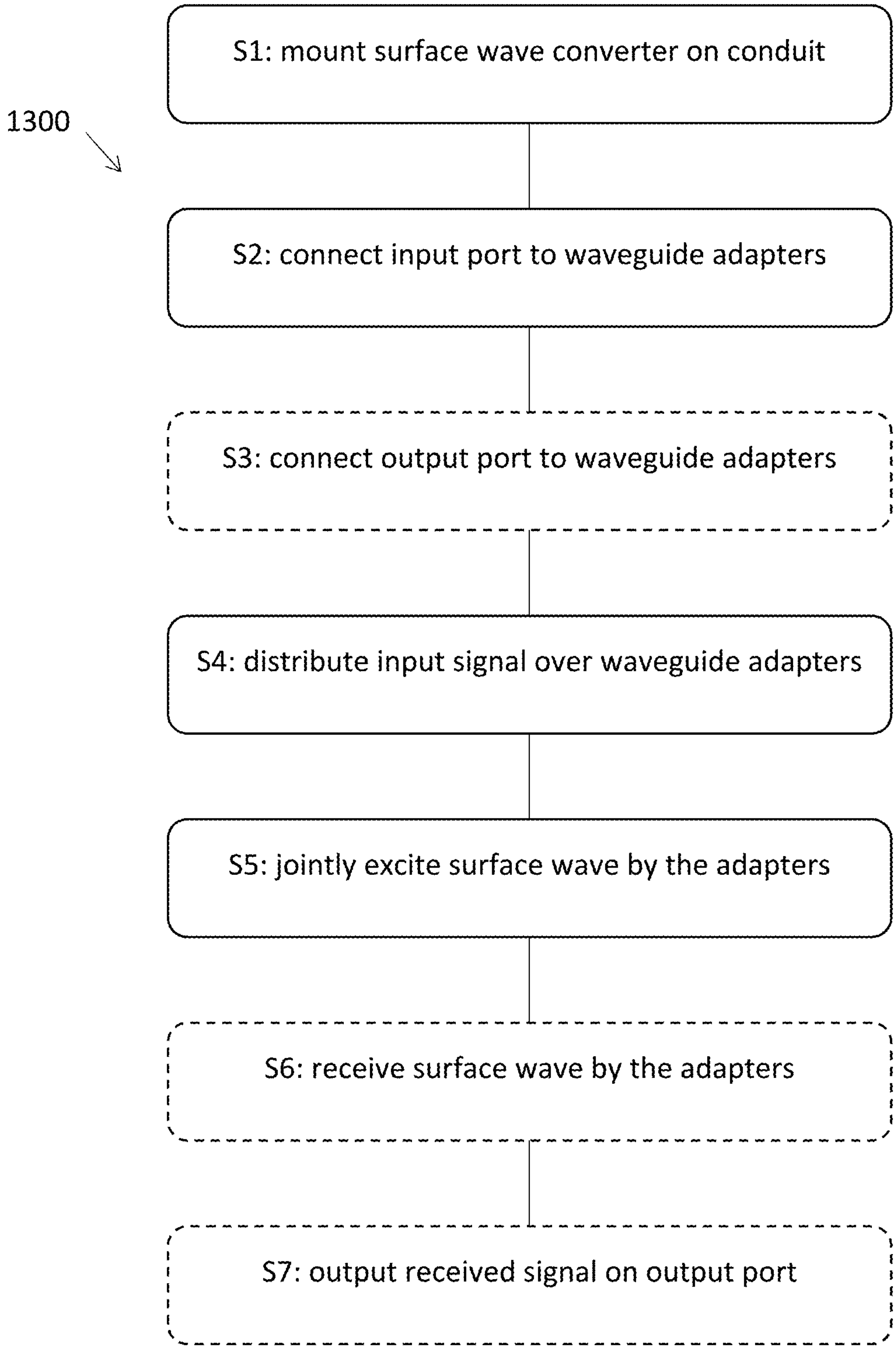

FIGS. 12A, 12B, and 13 are flow charts illustrating methods. FIG. 12A shows a method 1200 for transmitting electromagnetic surface wave signals via a surface wave conduit. The method 1200 comprises distributing 1201 an input signal received on an input port of a surface wave converter over a plurality of waveguide adapters; and jointly exciting 1203 a surface wave on a surface wave conduit by the plurality of waveguide adapters, based on the input signal. FIG. 12B shows a method 1210 for receiving electromagnetic signals via a surface wave conduit. The method 1210 comprises jointly receiving 1202 a surface wave on the surface wave conduit by a plurality of waveguide adapters of a surface wave converter; and outputting 1204 a signal, on an output port of the surface wave converter, based on the received surface wave. Those of ordinary skill in the art will appreciate that a surface wave converter according to one or more embodiments is configured to transmit electromagnetic surface wave signals in accordance with method 1200, receive electromagnetic signals in accordance with method 1210, or both. For example, a surface wave converter configured for bi-directional communication as described herein in one or more embodiments is configured to perform both methods. Thus, the illustrated methods 1200 and 1210 describe one or more operations of a surface wave converter discussed above in connection to FIGS. 1-11.

FIG. 13 shows a method 1300 for transmitting electromagnetic surface wave signals via a surface wave conduit 110. The method 1300 comprises mounting S1 a surface wave converter 100 comprising an interface 230 and a plurality of waveguide adapters 210 along a circumference 220 of the surface wave conduit 110, connecting S2 an input port 235 of the surface wave converter to the plurality of waveguide adapters 210 via the interface 230, distributing S4 an input signal received on the input port 235 over the waveguide adapters, and jointly exciting S5 a surface wave on the surface wave conduit 110 by the waveguide adapters, based on the input signal. Thus, the illustrated method describes an operation of the surface wave converter discussed above in connection to FIGS. 1-11.

In one or more embodiments herein, the method 1300 is also for receiving electromagnetic signals via the surface wave conduit 110. The method then comprises connecting S3 the plurality of waveguide adapters to an output port 520 of the surface wave converter via the interface 230, jointly receiving S6 a surface wave on the surface wave conduit 110 by the plurality of waveguide adapters 210, and outputting S7 a received signal on the output port 520.

The invention claimed is:

1. A surface wave converter for transmitting electromagnetic surface wave signals via a surface wave conduit, the surface wave converter comprising:

an input port configured to receive an input signal;

a plurality of waveguide adapters for mounting along a circumference of the surface wave conduit, wherein the plurality of waveguide adapters are configured to jointly excite a surface wave on the surface wave conduit based on the input signal; and an interface configured to distribute the input signal received on the input port of the surface wave converter over the plurality of waveguide adapters via respective waveguide adapter ports; and wherein the plurality of waveguide adapters are configured to electromagnetically match a transition between an electrical signal at the interface and a surface wave on the surface wave conduit.

2. The surface wave converter of claim 1, wherein the plurality of waveguide adapters are arranged evenly spaced along the circumference of the surface wave conduit.

3. The surface wave converter of claim 2, wherein the plurality of waveguide adapters constitutes three waveguide adapters arranged 120 degrees apart along the circumference of the surface wave conduit.

4. The surface wave converter of claim 1, wherein the surface wave conduit is a power line wire.

5. The surface wave converter of claim 1, wherein one or more of the plurality of waveguide adapters comprise open-ended coaxial cables.

6. The surface wave converter of claim 1, wherein the plurality of waveguide adapters are configured in a fixture, wherein the fixture is configured to maintain relative positions of the plurality of waveguide adapters on the circumference of the surface wave conduit.

7. The surface wave converter of claim 6, wherein the fixture is configured to galvanically isolate the plurality of waveguide adapters from the surface wave conduit.

8. The surface wave converter of claim 6, wherein the fixture comprises a dielectric element in which the plurality of waveguide adapters are embedded.

9. The surface wave converter of claim 8, wherein the dielectric element has a shape for matching an electromagnetic transition between the plurality of waveguide adapters and the surface wave conduit.

10. The surface wave converter of claim 6, wherein the fixture is separable into two or more pieces, wherein the two or more pieces are configured to enclose and to hold the surface wave conduit when mounted on the surface wave conduit.

11. The surface wave converter of claim 10, wherein the fixture comprises a joint and a locking mechanism.

12. The surface wave converter of claim 1, wherein the interface comprises an active or a passive power splitter device configured to distribute the input signal received on the input port over the plurality of waveguide adapters.

13. The surface wave converter of claim 1, wherein the interface comprises one or more phase shifters, each phase shifter configured to shift a phase of a signal output from a respective waveguide adapter in dependence of a phase shift configuration.

14. The surface wave converter of claim 1, wherein the interface comprises one or more filter structures configured to filter a signal prior to output from a respective waveguide adapter.

15. The surface wave converter of claim 1, wherein the surface wave converter is configured to receive electromagnetic signals via the surface wave conduit, wherein the interface is configured to connect the plurality of waveguide adapters to an output port of the surface wave converter; and wherein the plurality of waveguide adapters are configured to:

jointly receive a surface wave on the surface wave conduit; and to output, on the output port a signal based on the received surface wave.

16. The method of claim 1, wherein the input signal is an electrical or optical signal, and the surface wave converter is configured to convert the electrical or optical signal to the electromagnetic surface wave.

17. A communication system comprising a surface wave conduit and one or more surface wave converters, wherein each of the one or more surface wave converters comprises:

a respective input port configured to receive an input signal;

a respective plurality of waveguide adapters for mounting along a circumference of the surface wave conduit, wherein the respective plurality of waveguide adapters are configured to jointly excite a surface wave on the surface wave conduit based on the input signal; and a respective interface configured to distribute the input signal received on the respective input port over the respective plurality of waveguide adapters via respective waveguide adapter ports; and wherein the respective plurality of waveguide adapters for a given one of the one or more surface wave converters are configured to electromagnetically match a transition between an electrical signal at the respective interface of the given one and a surface wave on the surface wave conduit.

18. The communication system of claim 17, comprising one or more wireless access points connected to a communications interface via the one or more surface wave converters.

19. The communication system of claim 17, wherein the respective plurality of waveguide adapters for at least one of the one or more surface wave converters are arranged evenly spaced along the circumference of the surface wave conduit.

20. The communication system of claim 19, wherein the respective plurality of waveguide adapters for at least one of the one or more surface wave converters constitutes three waveguide adapters arranged 120 degrees apart along the circumference of the surface wave conduit.

21. The communication system of claim 17, wherein the surface wave conduit is a power line wire.

22. The communication system of claim 17, wherein one or more of the plurality of waveguide adapters comprise open-ended coaxial cables.

23. The communication system of claim 17, wherein the respective plurality of waveguide adapters of a given one of the surface wave converters are configured in a fixture, wherein the fixture is configured to maintain relative positions of the respective plurality of waveguide adapters on the circumference of the surface wave conduit.

24. The communication system of claim 23, wherein the fixture is configured to galvanically isolate the respective plurality of waveguide adapters from the surface wave conduit.

25. The communication system of claim 23, wherein the fixture comprises a dielectric element in which the respective plurality of waveguide adapters are embedded.

26. The communication system of claim 25, wherein the dielectric element has a shape for matching an electromagnetic transition between the respective plurality of waveguide adapters and the surface wave conduit.

27. The communication system of claim 23, wherein the fixture is separable into two or more pieces, wherein the two or more pieces are configured to enclose and to hold the surface wave conduit when mounted on the surface wave conduit.

28. The communication system of claim 27, wherein the fixture comprises a joint and a locking mechanism.

29. The communication system of claim 17, wherein the respective interface of a given one of the one or more surface wave converters comprises an active or a passive power splitter device configured to distribute the input signal received on the respective input port over the respective plurality of waveguide adapters.

30. The communication system of claim 17, wherein the respective interface of a given one of the one or more surface wave converters comprises one or more phase shifters, each phase shifter configured to shift a phase of a signal output from a respective waveguide adapter in dependence of a phase shift configuration.

31. The communication system of claim 17, wherein the respective interface of a given one of the one or more surface wave converters comprises one or more filter structures configured to filter a signal prior to output from a respective waveguide adapter.

32. The communication system of claim 17, wherein a given one of the one or more surface wave converters is configured to receive electromagnetic signals via the surface wave conduit, wherein the respective interface of the given one of the one or more surface wave converters is configured to connect the respective plurality of waveguide adapters to a respective output port of the given one of the one or more surface wave converters; and wherein the respective plurality of waveguide adapters of the given one of the one or more surface wave converters are configured to:

jointly receive a surface wave on the surface wave conduit; and output, on the respective output port, a signal based on the received surface wave.

33. A method for transmitting electromagnetic surface wave signals via a surface wave conduit, the method comprising:

distributing an input signal received on an input port of a surface wave converter over a plurality of waveguide adapters configured to electromagnetically match a transition between an electrical signal and a surface wave on a surface wave conduit; and jointly exciting a surface wave on the surface wave conduit by the plurality of waveguide adapters, based on the input signal.

34. The method of claim 33, wherein the method further comprises:

jointly receiving a surface wave on the surface wave conduit by the plurality of waveguide adapters of the surface wave converter; and outputting a signal, on an output port of the surface wave converter, based on the received surface wave.

35. The method of claim 33, wherein the method further comprises:

mounting the surface wave converter comprising the input port, an interface, and the plurality of waveguide adapters, the plurality of waveguide adapters for mounting along a circumference of the surface wave conduit; and connecting the input port of the surface wave converter to the plurality of waveguide adapters via the interface.

36. A method for receiving electromagnetic signals via a surface wave conduit, the method comprising:

jointly receiving a surface wave on the surface wave conduit by a plurality of waveguide adapters of a surface wave converter, wherein the plurality of waveguide adapters are configured to electromagnetically match a transition between an electrical signal and a surface wave on the surface wave conduit; and outputting a signal, on an output port of the surface wave converter, based on the received surface wave.

37. The method according to claim 36, further comprising:

connecting the plurality of waveguide adapters to the output port of the surface wave converter via an interface.

* * * * *